United States Patent [19]

Nakamura et al.

[11] Patent Number: 4,731,011

[45] Date of Patent: Mar. 15, 1988

[54] INJECTION BLOW MOLDING MACHINE

[75] Inventors: Yoshinori Nakamura; Kouhei Koga; Toshio Fujiwara; Satoru Kosuge, all of Sakakimachi, Japan

[73] Assignee: Nissei ASB Machine Co., Ltd., Japan

[21] Appl. No.: 27,207

[22] PCT Filed: Jun. 13, 1986

[86] PCT No.: PCT/JP86/00299

§ 371 Date: Feb. 11, 1987

§ 102(e) Date: Feb. 11, 1987

[87] PCT Pub. No.: WO86/07305

PCT Pub. Date: Dec. 18, 1986

[30] Foreign Application Priority Data

Jun. 14, 1985 [JP] Japan .................................. 60-129371

[51] Int. Cl.4 .................... B29C 49/04; B29C 49/12
[52] U.S. Cl. .................................. 425/529; 264/532; 264/538; 425/533; 425/534; 425/540; 425/541
[58] Field of Search ............... 264/532, 538; 425/522, 425/529, 533, 534, 537, 540, 541

[56] References Cited

U.S. PATENT DOCUMENTS 4,105,391 8/1978 Aoki .................................. 425/540
4,457,689 7/1984 Aoki .................................. 425/533

Primary Examiner—Jay H. Woo
Assistant Examiner—Timothy W. Heitbrink
Attorney, Agent, or Firm—Ostrolenk, Faber, Gerb & Soffen

[57] ABSTRACT

This invention discloses an injection blow molding machine comprising a circular rotary disk rotatably mounted on the underside of a base plate, the rotary disk being connected to an intermittently rotating and driving device installed on the central portion of the base plate, the required number of hold molds also serving as a mold for molding a mouth portion of a container being molded, the hold molds being provided at regular intervals on the undersurface of the rotary disk, a clamping device for an injection mold and a clamping device for a blow mold provided at stop positions of the hold molds so that the clamping devices are located vertically above and below the base plate. The base plate holding the rotary disk is secured to the peripheral edge of the machine bed, and the interior of the machine bed is formed into a molding operating space.

6 Claims, 6 Drawing Figures

INJECTION BLOW MOLDING MACHINE

FIELD OF THE INVENTION

This invention relates to a molding machine which can be used in the case where a preform is injection molded from a synthetic resin, and the resulting preform is immediately blow molded into a thin-wall container.

BACKGROUND OF THE INVENTION

Various constructions of machines for immediately molding an injection molded preform into a thin-wall container such as a bottle or cup have been well known. Particularly, a molding machine disclosed in U.S. Pat. No. 4,105,391, that is, a molding machine comprising a machine bed, a base plate disposed above the machine bed, a rotary disk provided on the undersurface of the base plate, and a space used for molding operation, the space being provided between the base plate and the machine bed, whereby the rotatably provided rotary disk is intermittently driven to successively feed injection molded preforms and blow molded products, is being widely used as a molding machine which can continuously carry out a series of operations of injection molding of preforms, temperature controlling and stretching and blow molding.

In the above-described well known molding machine, since the rotary disk is located on the undersurface of the base plate, support points of the base plate disposed above the machine bed are limited to the peripheral edge, and various operating portions such as injection, temperature control and blowing are provided in stop positions of neck molds provided in spaced apart relation on the undersurface of the rotary disk with a clamping device, a blowing device, etc. arranged, because of which the number of support points is limited to 3 to 4 points.

Therefore, it has not been possible to increase the diameter of the base plate and rotary disk so that the neck molds provided on the undersurface of the rotary disk and the devices provided on the base plate are made to a larger size for volume production of molded products, in terms of loads. Furthermore, tie bars of the clamping device are used to support the base plate, there poses problems such that with the trend of large size of the base plate, the supporting spacing becomes prolonged, and the foundation tends to flex.

SUMMARY OF THE INVENTION

This invention has been achieved in order to solve these problems noted above with respect to the conventional molding machine. It is an object of this invention to provide a molding machine having novel construction in which even if the support position of the base plate is at the peripheral edge, support points may be increased; tie bars of the clamping device need not be used to support the base plate; a large machine may be used for volume production; and the machine may be utilized not only for injection blow molding but for injection stretching blow molding.

For achieving the aforementioned object, the present invention is featurized in that a base plate having a circular rotary disk rotatably provided on the underside thereof is placed on the upper surface of a machine bed with the peripheral portion thereof fixed, the machine bed is interiorly provided with a molding operating space to accommodate therein a lower clamping mechanism of each clamping device provided vertically to injection and blow molding position of the base plate, and injection and blow molds are mounted on a lower clamping plate.

BRIEF DESCRIPTION OF THE DRAWINGS

The drawings illustrate an injection blow molding machine according to this invention.

BEST MODE FOR EMBODYING THE INVENTION

Figure 1:
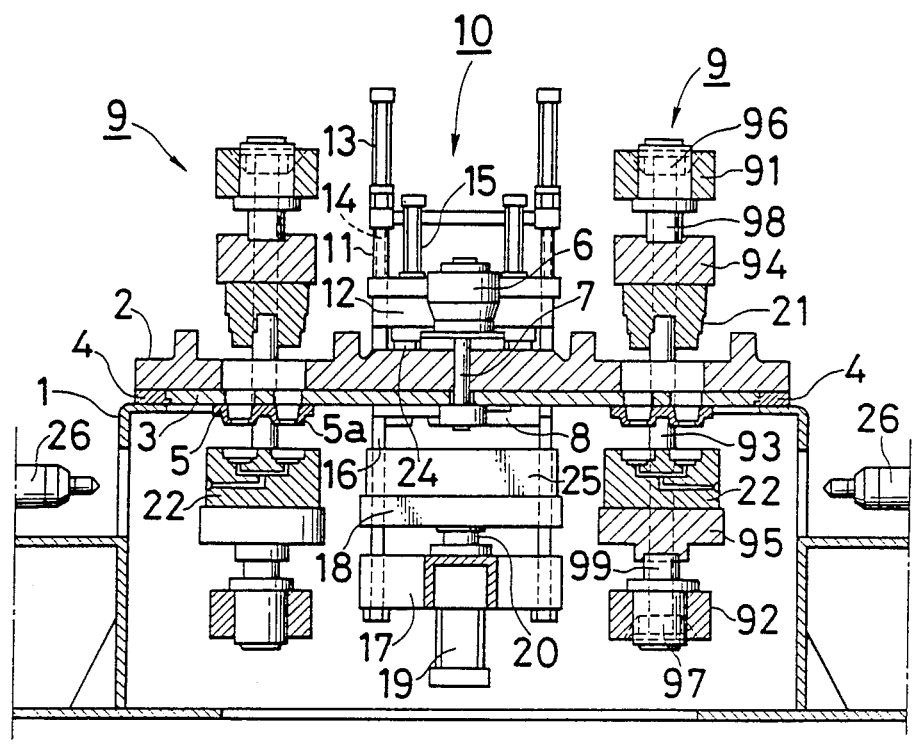
FIG. 1 is a longitudinal sectional view.
Figure 2:
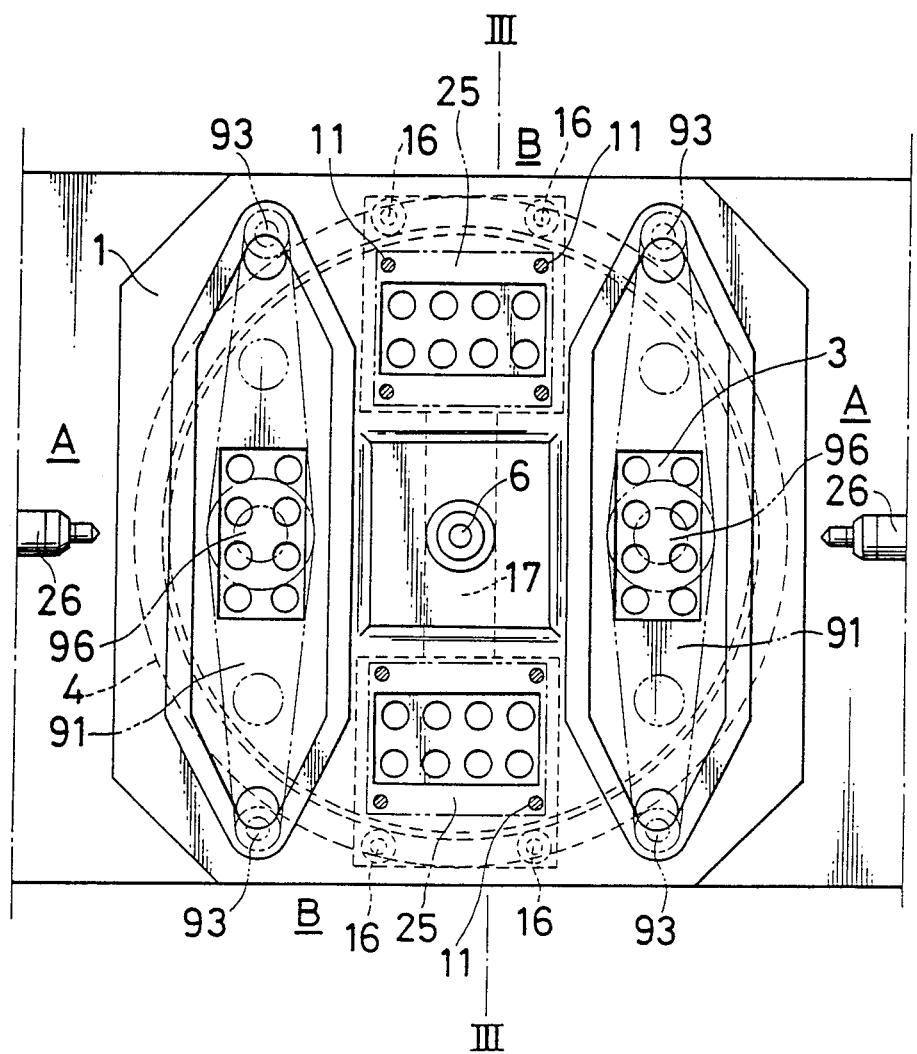
FIG. 2 is a plan view with various devices on the base plate removed.

In the drawings, reference numeral 1 designates a machine bed, 2 a base plate and 3 a circular rotary disk.

The upper surface of the machine bed 1 is open leaving the peripheral edge portions, and the base plate 2 is placed on the upper surface of the machine bed. The peripheral portion of the base plate is secured to the peripheral edge portion of the machine bed through receiving members 4.

On the underside of the base plate 2 is rotatably provided the rotary disk 3 with peripheral portions thereof held by the receiving members 4, and at four portions of the undersurface of the rotary disk 3 are mounted hold molds 5 which also serve as molds for molding a preform mouth. The rotary disk 3 is connected through a shaft 7 and an arm 8 to a driving device 6 in the form of a hydraulic pressure actuator installed in the central portion on the upper surface of the base plate 2. Although not shown, the rotary disk 3 is intermittently moved by 90° similar to the intermittent rotating means disclosed in U.S. Pat. No. 4,105,391.

The aforesaid hold mold 5 stops at an injection operating stage A and a blow operating stage B. In the illustrated embodiment, the opposed positions are utilized for one and the same operating stage so that injection molding and blow molding may be carried out simultaneously at two locations.

In the injection operating stage A, an injection clamping device 9 is provided vertically to the base plate 2, and in the blow molding stage B, a blow clamping device 10 is provided vertically.

The clamping device 9 comprises an upper clamping mechanism on the base plate and a lower clamping mechanism within the machine bed. An upper fixed plate 91 and a lower fixed plate 92 in the clamping device 9 are connected by means of two tie bars 93 which extend through the base plate 2, and upper and lower clamping plates 94 and 95 are mounted movably up and down on the tie bars. The upper and lower clamping plates 94 and 95 are connected to rams 98 and 99 of clamping cylinders 96 and 97 provided on the upper and lower fixed plates 91 and 92, respectively. Although not shown, a hydraulically-operated quick feed device is provided over the upper fixed plate 91 and the upper clamping plate 94.

An injection core 21 positioned in a mold portion 5a of the hold mold 5 from a hole formed in the base plate 2 and the rotary disk 3 is provided on the underside of the upper clamping plate 94, and an injection mold 22 is mounted on the upper surface of the lower clamping plate 95.

The upper clamping mechanism of the blow clamping device 10 is designed so that the upper clamping plate 12 is inserted movably up and down into four guide rods 11 stood upright on the base plate, and a rod 14 of the clamping cylinder 13 above the guide rod is connected to the upper clamping plate 12. A blow core 24 provided with a stretching rod 23 (see FIG. 5), which is moved up and down by means of an air cylinder 15 provided on the upper surface of the upper clamping plate 12 is mounted on the undersurface of the upper clamping plate 12, the blow core 24 being positioned in the mold portion 5a from the hole formed in the base plate 2 and the rotary disk 3 similar to the injection core 21.

Figure 3:
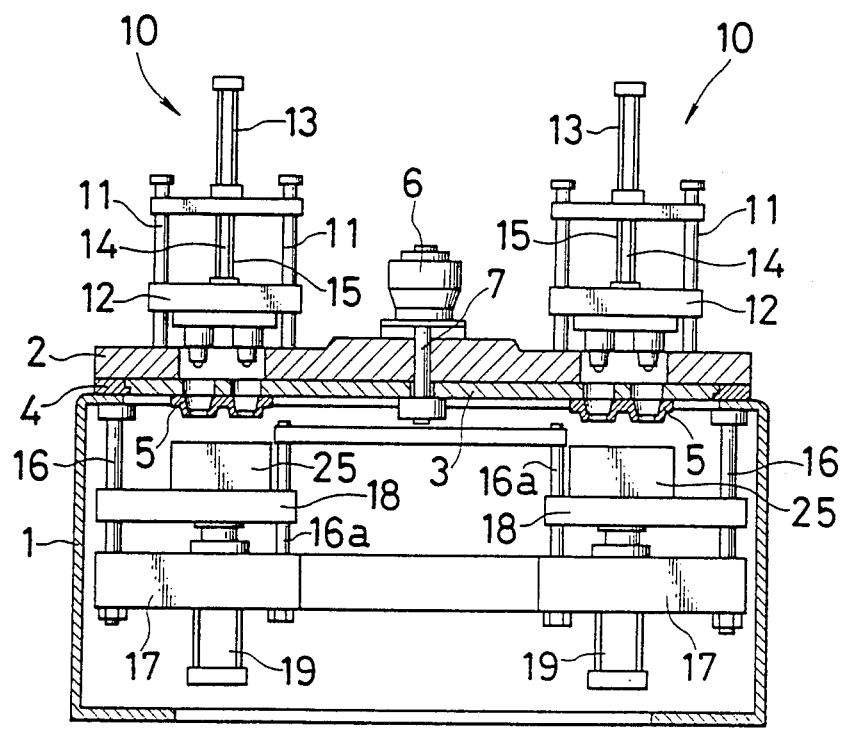
FIG. 3 is a sectional view taken on line III—III of FIG. 2.

The lower clamping mechanism of the blow clamping device 10 is designed so that as shown in FIGS. 1 and 3, a lower fixed plate 17 is connected over four tie bars 16 suspended within the machine bed from the opposite peripheral edges of the rotary disk 2, a lower clamping plate 18 is inserted into the tie bars 16 and a plurality of guide rods 16a stood upright on the lower fixed plate 17, and a ram 20 of a clamping cylinder 19 provided on the lower fixed plate 17 is connected to the undersurface of the lower clamping plate 18. A blow mold 25 is mounted on the lower clamping plate 18 above the lower fixed plate 17 being suspended over the aforesaid two blow operating stages B, B.

In the above-described molding machine, the interior of the machine bed 1 is utilized as an operating space, and operations from injection molding of a preform to blow molding of thin-wall containers, for example, such as cups, are carried out within the machine bed.

Figure 4:
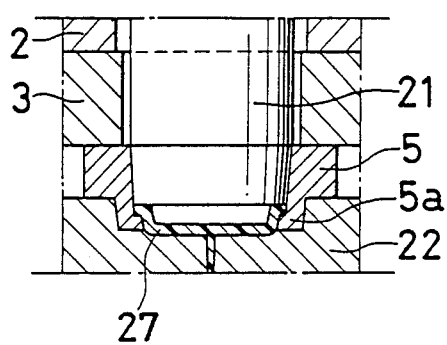
FIGS. 4 to 6 are partial sectional views, respectively, showing the molding steps in order.

Injection molding is carried out by bringing injection devices 26 on the machine bed provided on opposite sides of the machine bed into nozzle touch with the injection mold 22 after clamping has been completed. Resin is injected from the injection device 26 to thereby mold a flat preform 27 as shown in FIG. 4, and the resulting preform 27 is transported along with the hold mold 5 to the blow operating stage B by horizontal movement of the rotary disk 3 after mold has been opened.

Figure 5:
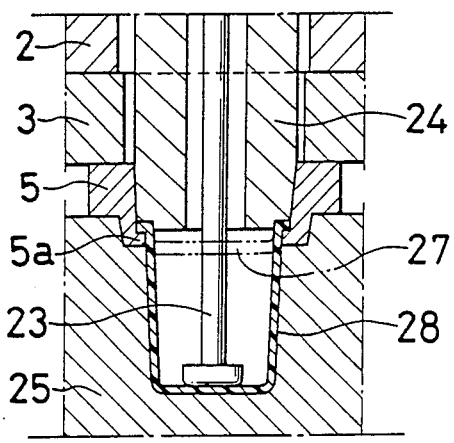

After completion of clamping in the blow operating stage B, the preform is stretched by means of a stretching rod 23, as shown in FIG. 5, and the preform is further expanded fully within the cavity of the blow mold 25 by blowing air therein so that a cup 28 is molded.

Figure 6:
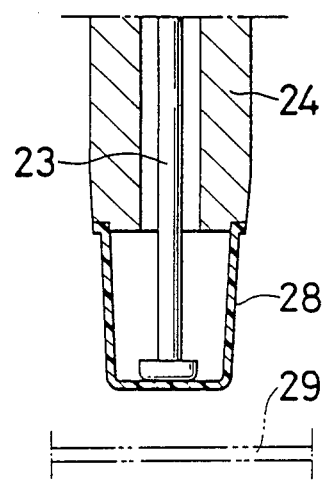
Figure 6:
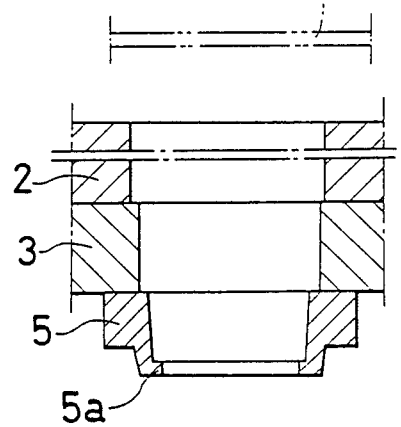

This cup 28 is removed, after the mold has been opened, above the base plate together with the blow core 24 by the action of attraction, as shown in FIG. 6, and the cup 28 is further fallen onto a transfer member 29 inserted underside of the cup and ejected out of the machine.

INDUSTRIAL APPLICABILITY

As described above, according to this invention, the base plate is placed on the machine bed, the peripheral edge thereof is secured to the machine bed and the interior of the machine bed is utilized as an operating space. Therefore, the molding machine of this invention becomes rigid as compared with the conventional construction which has a limitation in support of the base plate, and even if the load of the base plate should increase, there occurs no influence on the supporting. Thereby the base plate as well as other devices may be made to have a large size for an increase in productivity. Furthermore, since the base plate is secured to the machine bed, fixation of the base plate may be facilitated as compared with the case where the tie bars are used to provide supporting, and in addition, the supporting structure may be simplified. Thus the molding machine of this invention is applied as the optimum injection blow molding machine.

What is claimed is:

1. An injection blow molding machine comprising a circular rotary disk rotatably mounted on an underside of a base plate, said rotary disk being connected to an intermittently rotating and driving device installed on a central portion of said base plate, a required number of hold molds also serving as a mold for molding a mouth portion of a container, said hold molds being provide at regular intervals on the undersurface of said rotary disk, a clamping device for an injection mold and a clamping device for a blow mold, each said clamping device provided at stop positions of said hold molds so that said clamping devices are located vertically above and below the base plate, characterized in that said rotary disk is placed on the upper surface of a machine bed with peripheral portions of said rotary disk fixed to said machine bed fixed, and an interior of the machine bed formed into a molding operating space to accommodate therein a lower clamping mechanism of each of said clamping devices.

2. The injection blow molding machine according to claim 1 wherein said clamping device for the blow mold comprises, an upper clamping plate inserted movably up and down into a required number of guide rods stood upright on the base plate, an upper clamping mechanism provided with a clamping cylinder having a rod connected to said upper clamping plate, a lower fixed plate provided over four tie bars suspended within the machine bed from opposite edges of said rotary disk, and a lower clamping mechanism provided with a lower clamping device which is inserted into said tie bars a plurality of second guide rods stood upright on said lower fixed plate and of a ram a second clamping cylinder provided on said fixed plate being connected to an underside of said lower clamping plate.

3. The injection blow molding machine according to claim 1 wherein said upper clamping plate comprises a blow core provided with a stretching rod, said blow core positioned within a mold portion of said hold mold from a hole formed in said base plate and rotary disk.

4. The injection blow molding machine according to claim 1 wherein two sets of said clamping devices are alternately provided in positions in which the hold molds stop, and injection devices being horizontally opposedly provided on each injection mold clamping device.

5. The injection blow molding machine according to claim 2 wherein said upper clamping plate comprises a blow core provided with a stretching rod, said blow core positioned within a mold portion of said hold mold from a hole formed in said base plate and rotary disk.

6. The injection blow molding machine according to claim 2 wherein two sets of said clamping devices are alternately provided in positions at which the hold molds stop, and injection devices are horizontally opposedly provided on each injection mold clamping device.

* * * * *